(12) United States Patent
Raiser

(10) Patent No.: US 7,355,831 B2
(45) Date of Patent: Apr. 8, 2008

(54) Y-CAPACITANCE FAULT CURRENT DISCHARGE COMPENSATION FOR HVDC SYSTEMS

(75) Inventor: Stephen Raiser, Egelsbach (DE)

(73) Assignee: GM Global Technology Operations, Inc., Detroit, MI (US)

( * ) Notice: Subject to any disclaimer, the term of this patent is extended or adjusted under 35 U.S.C. 154(b) by 224 days.

(21) Appl. No.: 11/227,456

(22) Filed: Sep. 15, 2005

(65) Prior Publication Data

US 2007/0058311 A1   Mar. 15, 2007

(51) Int. Cl.
*H02H 9/02* (2006.01)
(52) U.S. Cl. .................................... 361/93.1
(58) Field of Classification Search ............... 361/42, 361/45, 93, 100; 324/509, 510
See application file for complete search history.

(56) References Cited

U.S. PATENT DOCUMENTS

| 6,040,561 A | * | 3/2000 | Murty | 219/494 |
| 2003/0155928 A1 | * | 8/2003 | Roden et al. | 324/509 |
| 2007/0116997 A1 | * | 5/2007 | Raiser | 429/23 |

* cited by examiner

*Primary Examiner*—Michael Sherry
*Assistant Examiner*—Boris Benenson

(57) ABSTRACT

A fuel cell system or HVDC power source includes a fuel cell or DC power source having a high voltage direct current (HVDC) bus including y-capacitors, which connect the HVDC bus terminals to chassis or safety ground, and a fault current discharge compensation circuit interconnected with the HVDC bus. A monitoring circuit monitors a fault discharge current of the Y-cap circuit and generates a fault signal when the fault current occurs based on a rate of change of a voltage of the Y-cap circuit. A switching circuit redirects the majority of the fault discharge current.

17 Claims, 4 Drawing Sheets

US 7,355,831 B2

Y-CAPACITANCE FAULT CURRENT DISCHARGE COMPENSATION FOR HVDC SYSTEMS

FIELD OF THE INVENTION

The present invention relates to fuel cells or other automotive HVDC sources, and more particularly to a y-capacitor discharge fault current compensation system for fuel cell stacks.

BACKGROUND OF THE INVENTION

Fuel cell stacks operate at relatively high voltage levels and higher temperatures. The fuel cell system includes a high voltage direct current (HVDC) bus that provides power from the fuel cell stacks to a load. The HVDC bus is subject to electromagnetic interference (EMI), which detrimentally effects the performance of the fuel cell system. Y-capacitors (Y-caps) are incorporated to protect the HVDC bus from EMI. The Y-caps bridge the positive and/or negative DC to chassis or safety ground.

In the event of a fault contact, the Y-caps discharge through the resistance of the fault contact. For example, when a person touches either the positive or negative nodes of the HVDC bus and chassis or safety ground, the Y-caps discharge through the body of the person. As a result, the capacitance of the Y-caps must be limited to ensure that the energy released in the event of a fault contact is within safe limits. Because the Y-caps are limited, the ability to protect against EMI is correspondingly limited.

SUMMARY OF THE INVENTION

Accordingly, the present invention provides a fuel cell system that includes a fuel cell having a high voltage direct current (HVDC) bus and a fault current discharge compensation circuit interconnected with the HVDC bus. The HVDC bus includes a Y-capacitance (Y-cap) circuit that bridges the positive and/or negative HVDC terminals to chassis or safety ground. A monitoring circuit monitors a fault discharge current of the Y-cap circuit and generates a fault signal when the fault current occurs. A switching circuit redirects the fault discharge current based on a rate of change of a voltage of the Y-cap circuit.

In one feature, the Y-cap circuit bridges positive and negative terminals of the HVDC bus to chassis or safety ground.

In another feature, the monitoring circuit generates the fault signal based on the rate of change of the output voltage of the HVDC bus terminals with respect to chassis or safety ground.

In another feature, the fault signal is based on the fault discharge current.

In another feature, the switching circuit includes an operational amplifier that generates an output signal. A first switch selectively enables an alternate path from HVDC negative to ground for the fault discharge current based on the output signal. A second switch selectively enables an alternate path from HVDC positive to ground for the fault discharge current based on the output signal. When a fault condition is generated at a positive terminal of the HVDC bus, the op-amp signals the second switch to enable the alternate path. When a fault condition is generated at a negative terminal of the HVDC bus, the op-amp signals the first switch to enable the alternate path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
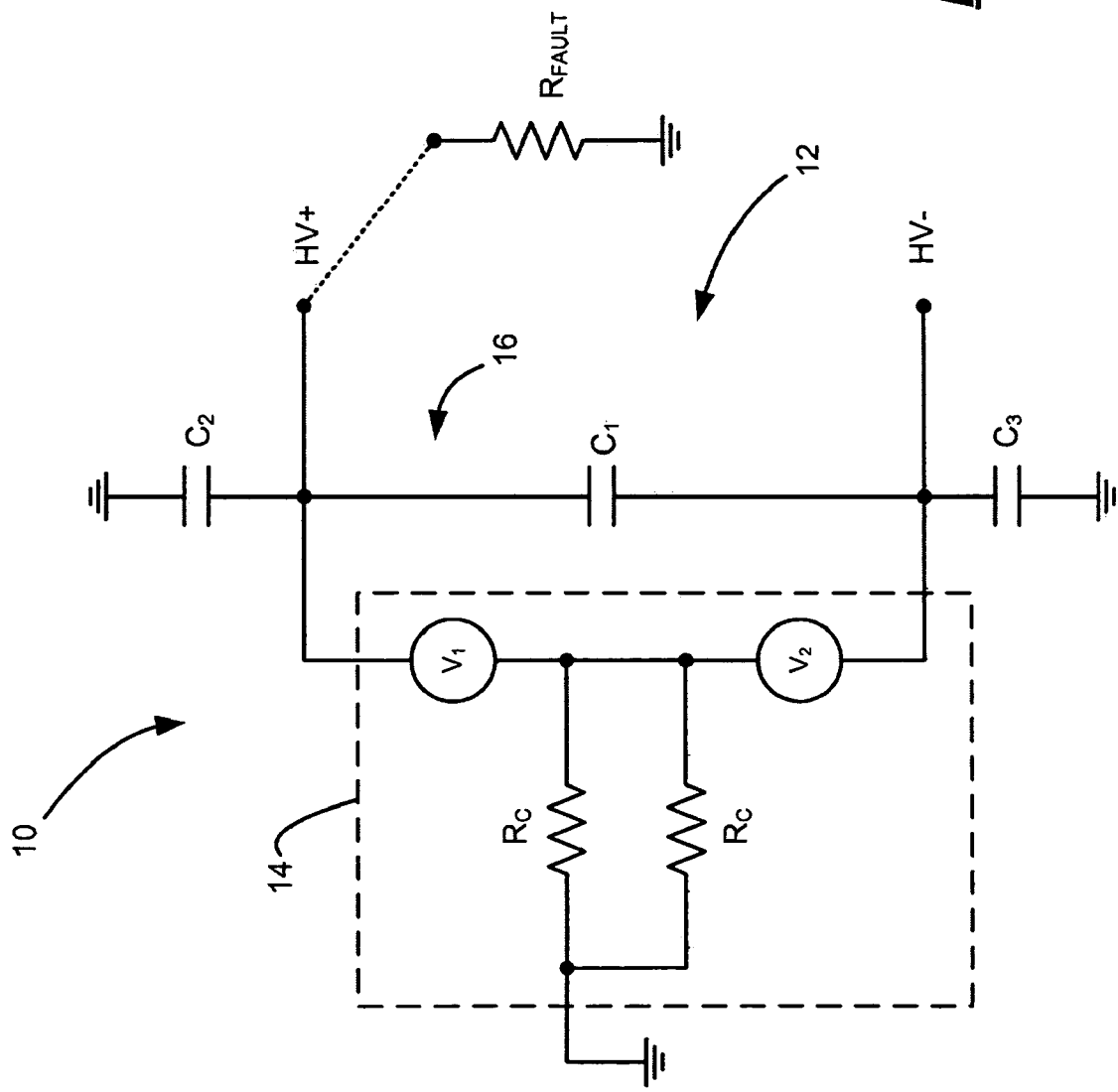
FIG. 1 is an electrical schematic of a high voltage (HV) bus including Y-capacitors.

The following description of the preferred embodiments is merely exemplary in nature and is in no way intended to limit the invention, its application, or uses. For purposes of clarity, the same reference designations will be used in the drawings to identify similar elements.

Referring now to FIG. 1, a fuel cell system 10 includes a high voltage direct current (HVDC) power bus 12 and a fuel cell stack 14. The fuel cell stack 14 is represented as two voltage sources $V_1$ and $V_2$. Exemplary values for $V_1$ and $V_2$ are 200V, although other values may be used. Assuming 200V for $V_1$ and $V_2$, the total voltage across the fuel cell stack 14 is 400V. The fuel cell stack 14 includes coolant flowing through manifolds. Since the coolant can be conductive (not a perfect electrical insulator), the coolant forms resistive paths from the fuel cell through the coolant tubes towards grounded metallic parts of the coolant system (e.g. vehicle front radiator). The coolant inlet/exit is indicated as parallel resistors $R_c$. Exemplary values for the resistors $R_c$ are 20 kΩ each or 10 kΩ total.

The HVDC power bus 12 includes positive and negative nodes (HV+ and HV−, respectively) and a capacitor circuit 16. Given the exemplary values of $V_1$ and $V_2$ and assuming the voltage balance is symmetrical, HV+ is at +200V and HV− is at −200V. The capacitor circuit includes capacitors $C_1$, $C_2$ and $C_3$. C1 is called X-capacitor and bridges HV+ and HV−. C2 and C3 are called Y-capacitors and bridge HV+ to chassis or safety ground or HV− to chassis or safety ground. Capacitors can be distributed across multiple electric devices connected to the HVDC bus and are represented as lumped single capacitors here. Exemplary values for $C_1$, $C_2$ and $C_3$ are 3000 μF, 5 μF and 5 μF, respectively. The Y-capacitors C2,C3 protects the HVDC power bus 12 from electromagnetic interference (EMI).

Figure 3:
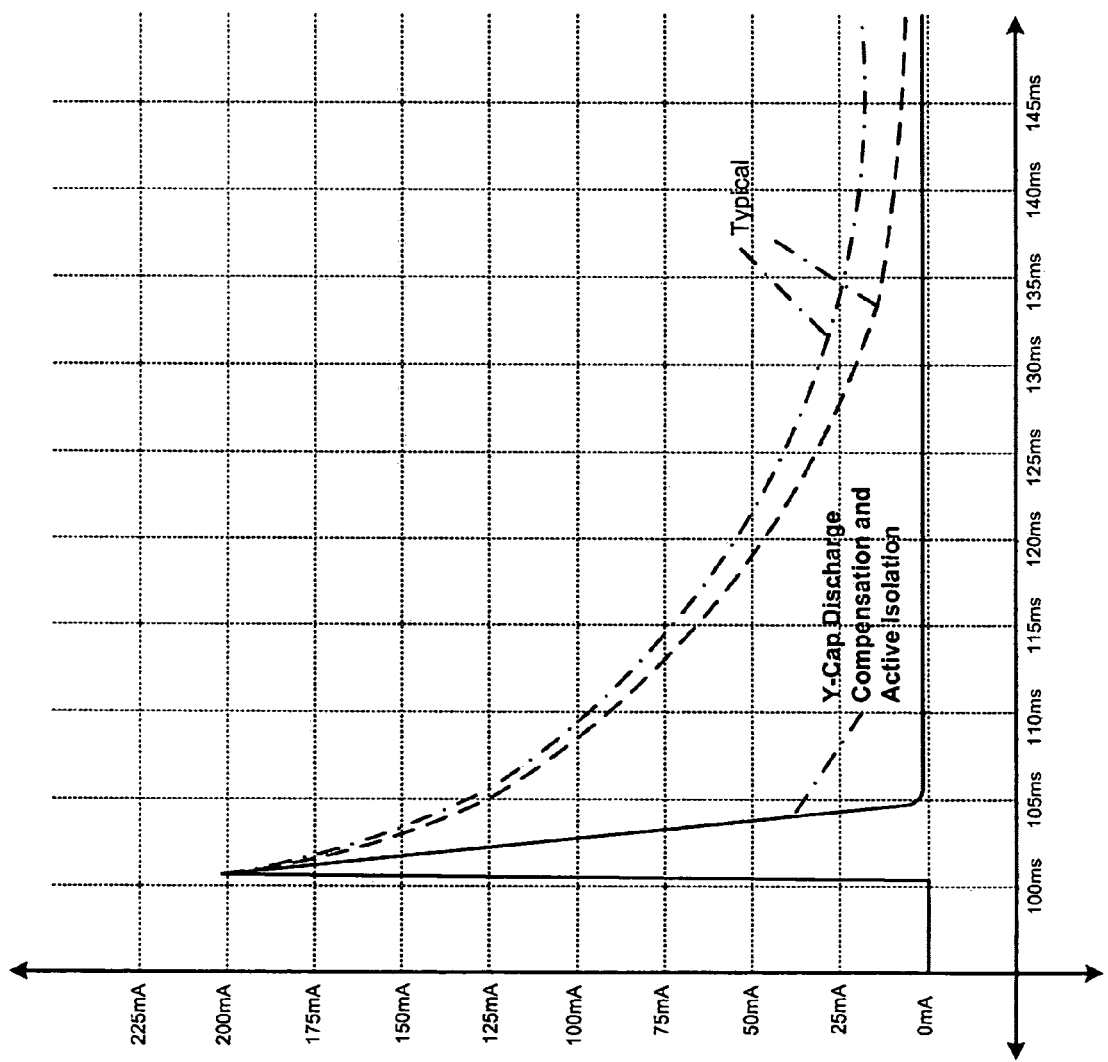
FIG. 3 is a graph illustrating fault discharge currents according to the present invention.

A typical fault contact, for example a human body, is indicated as a fault resistance $R_{FAULT}$. Although the fault contact is shown at HV+, the fault contact can also occur at HV− or at any intermediate voltage. An exemplary value for $R_{FAULT}$ is 1 kΩ. As a result of the fault contact, a discharge current causes the Y-cap circuit 16 to discharge through $R_{FAULT}$ to ground. The energy in the Y-cap circuit that is dissipated during the fault contact is equal to ½ $CV^2$. As shown in FIG. 3, which is discussed in further detail below, the typical discharge current immediately peaks upon fault contact and then gradually decreases to under 25 mA, given the exemplary values provided herein. The area beneath the typical discharge current curve indicates the energy that is dissipated through $R_{FAULT}$ (e.g., human body).

Figure 2:
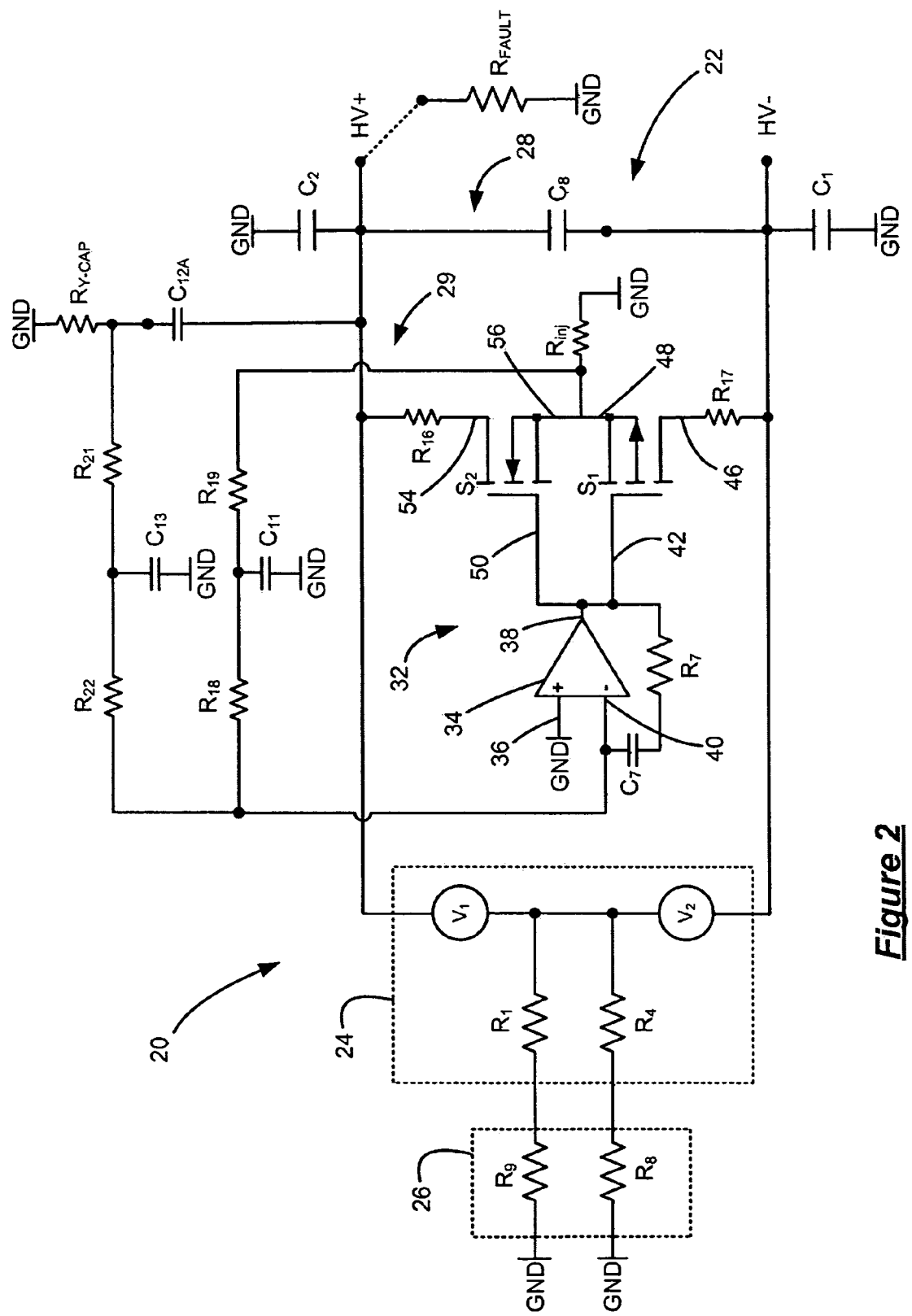
FIG. 2 is an electrical schematic of the HV bus incorporating a Y-capacitor (Y-cap) discharge compensation circuit according to the present invention.

Referring now to FIG. 2, a fuel cell system 20 includes a high voltage direct current (HVDC) power bus 22 and a fuel cell stack 24. The fuel cell stack 24 is represented as two voltage sources $V_1$ and $V_2$. Exemplary values for $V_1$ and $V_2$ are 200V, although other values may be used. Assuming 200V for $V_1$ and $V_2$, the total voltage across the fuel cell stack 24 is 400V. The fuel cell stack. 24 includes coolant flowing through manifolds, which is indicated as parallel resistors $R_1$ and $R_4$. Exemplary values for $R_1$ and $R_4$ are 22 kΩ and 18 kΩ, respectively. The coolant is provided by a coolant system 26 as indicated by parallel resistors $R_9$ and $R_8$. Exemplary values for $R_9$ and $R_8$ are 10 kΩ each. $R_9$ and $R_8$ are in respective series connection with $R_1$ and $R_4$. The coolant represented by R8 and R9 are in contact with chassis or safety ground through metallic coolant loop members (e.g. radiator).

The HVDC power bus 22 includes positive and negative nodes (HV+ and HV–, respectively) and a capacitor circuit 28. Given the exemplary values of $V_1$ and $V_2$ and assuming that the voltage balance is symmetrical, HV+ is at +200V and HV– is at –200V. The cap circuit 28 includes capacitors $C_8$, $C_1$ and $C_2$. Exemplary values for $C_8$, $C_1$ and $C_2$ are 3000 μF, 5 μF and 5 μF, respectively. The cap-circuit 28 protects the HVDC power bus from electromagnetic interference (EMI). The Y-capacitors C2,C3 bridges the HVDC power bus to a vehicle chassis (not shown) or safety ground.

A Y-cap discharge compensation circuit 29 bridges the HVDC power bus 22 and includes a monitoring circuit 30 and a switching circuit 32. The monitoring circuit 30 includes capacitors $C_{11}$, $C_{12}$ and $C_{13}$ and resistors $R_{Y-CAP}$, $R_{18}$, $R_{19}$, $R_{21}$, and $R_{22}$. Exemplary values for $C_{11}$, $C_{12}$ and $C_{13}$ include 1 μF each. An exemplary value for $R_{Y-CAP}$ includes 100Ω and exemplary values for $R_{18}$, $R_{19}$, $R_{21}$ and $R_{22}$ include 5 kΩ each.

The switching circuit 32 includes an operational amplifier (op-amp) 34, a first n-Channel MOSFET transistor switch $S_1$ and a second p-Channel MOSFET transistor $S_2$. The op-amp 34 includes a positive input 36 that is connected to ground. An output 38 is connected to $S_1$ and $S_2$. A negative input 40 is connected to the monitoring circuit and the output through a capacitor $C_7$ and a resistor $R_7$. $S_1$ includes a gate input 42 that is connected to the op-amp output 38. An input 46 (Drain) is connected to HV– through a resistor $R_{17}$ and an output 48 (Source) is connected to ground through a resistor $R_{INJ}$. $S_2$ includes a gate input 50 that is connected to the op-amp output 38. An input (Drain) 54 is connected to HV+ through a resistor $R_{16}$ and an output 56 (Source) is connected to ground through the resistor $R_{INJ}$. Exemplary values for $R_{16}$ and $R_{17}$ include 50 Ω each and an exemplary value for $R_{INJ}$ includes 10Ω. $S_1$ and $S_2$ function as switches. When in a conductive state, $S_1$ and $S_2$ provide an alternate current path from the HVDC bus terminals to ground through $R_{INJ}$ and R16 or R 17.

In operation, the monitoring circuit 30 provides current to the switching circuit 32 indicating a discharge current of the Y-capacitors C2,C3 circuit 28. More particularly, the monitoring circuit 30 monitors the rate of change of voltage (dV/dt) of the HVDC bus terminals with respect to chassis or safety ground. If dV/dt of the HVDC bus terminals is greater than a threshold level, a fault discharge current situation is indicated. That is to say, the Y-capacitors C2 or C3 are being caused to discharge by a fault contact such as a person touching either HV+, HV– or any intermediate voltage point.

The op-amp 34 receives the current signal from the monitoring circuit 30. More particularly, the dV/dt signal is generated by the differentiating capacitor-resistor network that includes $R_{Y-CAP}$ and $C_{12}$. The dV/dt signal is filtered and smoothed by R21 and $C_{13}$. The filtered signal causes the output 38 of the Op-Amp to change to positive or negative depending on the sign of dV/dt, which depends on the fault location being on the positive or negative HVDC bus terminal. If the OpAmp output exceeds the turn on gate threshold voltage of the MOSFET switches S1 (e.g. –5V) or S2 (e.g. +5V), it causes S1 or S2 to turn on, which redirects the main fault discharge current path. For example, in the event of a fault at HV+, as illustrated in FIG. 2, the op-amp output closes $S_2$ to create a discharge path to ground through R16 and $R_{INJ}$. As a result, the energy of the Y-cap circuit 28 is dissipated mainly through R16 and $R_{INJ}$ instead of through $R_{FAULT}$. Similarly, in the event of a fault at HV–, the op-amp output closes $S_1$ to create a discharge path to ground through R17 and $R_{INJ}$.

Referring now to FIG. 3, a graph illustrates Y-cap fault discharge currents according to the present invention. Typical discharge currents for conventional circuits are illustrated by the dashed lines. The discharge current for the discharge compensation circuit 29 of the present invention is illustrated by the solid line. The discharge current drops more rapidly. Additionally, the area under each of the curves indicates the amount of energy dissipated through $R_{FAULT}$. A significantly decreased amount of energy is dissipated through $R_{FAULT}$ using the discharge compensation circuit 29.

Figure 4:
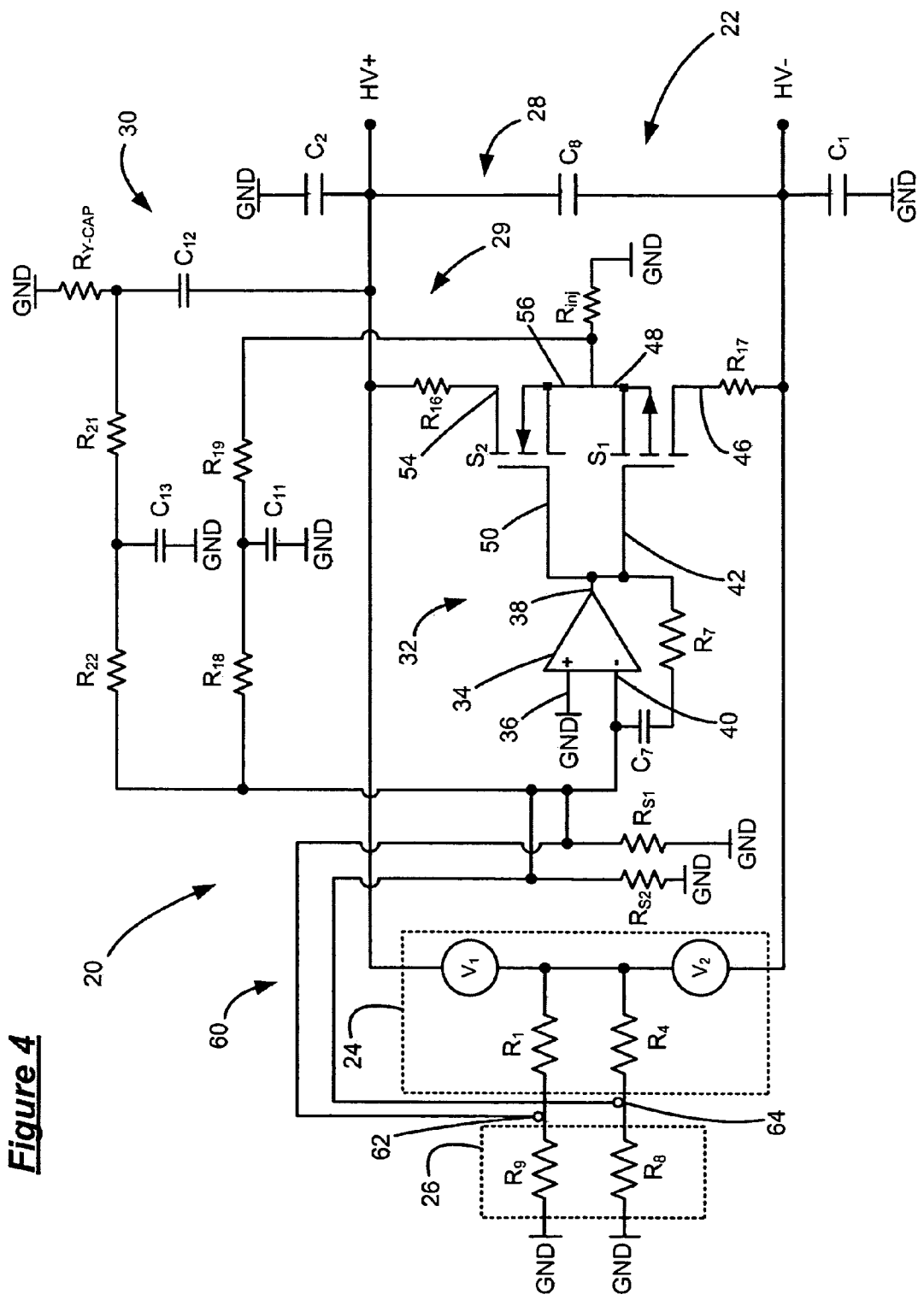
FIG. 4 is an electrical schematic of the HV bus incorporating an active isolation circuit according to the present invention.

Referring now to FIG. 4, the fuel cell system 20 includes an active isolation circuit 60. The active isolation circuit includes ground fault current sensors 62, 64 that are associated with the coolant. The fault sensors 62, 64 are connected to the inverting input 40 of the op-amp 34 and ground through resistors $R_{S1}$ and $R_{S2}$, respectively. The fault sensors 62, 64 measure net fault current flowing through all coolant resistant paths of the fuel cell system 20. Although the fuel cell system 20 of FIG. 4 is shown to include both the Y-cap discharge compensation circuit 29 and the active isolation circuit 60 together, the function of the active isolation circuit 60 can be achieved using the active isolation circuit 60 and the switching circuit 32 alone.

In the event of a sufficient fault current through the coolant resistance paths, the active isolation circuit 60 signals the switching circuit 32 to provide a discharge path to ground. For example, when a sufficient negative fault current is detected by the fault sensor 64 or 62, the op-amp output closes $S_2$ to create a discharge path to ground through R16+$R_{INJ}$. As a result, the fault current is forced towards 0 mA. Similarly, when a sufficient positive fault current is detected by the fault sensor 62 or 64, the op-amp output closes $S_1$ to create a discharge path to ground through R17 and $R_{INJ}$, again resulting in the fault current being forced towards 0 mA.

The active isolation circuit 29 supports a fuel cell stack coolant scheme that includes a low conductivity coolant entering and exiting the fuel cell stack 24. Furthermore, implementation of the active isolation circuit 29 requires the use of isolated or non-conductive coolant manifolds or non-conductive coolant entrance and exit areas to form a high resistance path upstream and downstream of the fault sensors 62, 64.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An apparatus, comprising:
   a high voltage direct current (HVDC) source having an HVDC bus; and
   a capacitor circuit incorporating y-capacitors which bridge terminals of said HVDC bus to chassis or safety ground;
   a fault current discharge circuit interconnected with said HVDC bus and comprising:
   a monitoring circuit that monitors a fault discharge current of said Y-cap circuit and that generates a fault signal when said fault current occurs; and
   a switching circuit that redirects said fault discharge current based on a rate of change of a voltage of said Y-cap circuit via an alternate path to chassis or safety ground.

2. The apparatus of claim 1 wherein said monitoring circuit generates said fault signal based on said rate of change of said output voltage of the positive or negative HVDC bus with respect to chassis or safety ground.

3. The apparatus of claim 1 wherein said fault signal is based on said fault discharge current.

4. The apparatus of claim 3 wherein said switching circuit comprises:
   an operational amplifier that generates an output signal; and
   a first switch that selectively enables an alternate path to ground for said fault discharge current based on said output signal; and
   a second switch that selectively enables an alternate path to ground for said fault discharge current based on said output signal.

5. The apparatus of claim 4 wherein when a fault condition is generated at a positive terminal of said HVDC bus, said op-amp signals said second switch to enable said alternate path.

6. The apparatus of claim 4 wherein when a fault condition is generated at a negative terminal of said HVDC bus, said op-amp signals said first switch to enable said alternate path.

7. A fault current discharge circuit for a high voltage direct current (HVDC) system including a HVDC bus with a Y-capacitance (Y-cap) circuit that communicates with said HVDC bus, comprising:
   a monitoring circuit that monitors said Y-cap circuit for an fault current and that generates a fault signal when said fault current occurs; and
   a switching circuit that redirects said fault discharge current when said monitoring circuit generates said fault signal via an alternate path to chassis or ground.

8. The fault discharge circuit of claim 7 wherein said monitoring circuit generates said fault signal based on a discharge rate of said Y-cap circuit.

9. The fault discharge circuit of claim 7 wherein said fault signal is based on said fault discharge current.

10. The fault discharge circuit of claim 7 wherein said switching circuit comprises:
    an operational amplifier that generates an output signal; and
    a switch that selectively enables an alternate path to ground for said discharge current based on said output signal.

11. The fault discharge circuit of claim 10 wherein said switch includes MOSFET transistors that enables said alternate path when in an on mode.

12. A fault current discharge circuit interconnected with a high voltage direct current (HVDC) bus of a fuel cell system with a Y-capacitance (Y-cap) circuit that communicates with said HVDC bus, comprising:
    a monitoring circuit that monitors an fault discharge current of said Y-cap circuit and that generates a fault signal when said fault current occurs; and
    a switching circuit that redirects said fault discharge current based on a rate of change of a voltage of said Y-cap circuit via an alternate path to chassis or ground.

13. The fault discharge circuit of claim 12 wherein said monitoring circuit generates said fault signal based on said rate of change of said voltage.

14. The fault discharge circuit of claim 12 wherein said fault signal is based on said fault discharge current.

15. The fault discharge circuit of claim 12 wherein said switching circuit comprises:
    an operational amplifier that generates an output signal; and
    a first switch that selectively enables an alternate path to ground for said fault discharge current based on said output signal; and
    a second switch that selectively enables an alternate path to ground for said fault discharge current based on said output signal.

16. The fault discharge circuit of claim 15 wherein when a fault condition is generated at a positive terminal of said HVDC bus said op-amp signals said second switch to enable said alternate path.

17. The fault discharge circuit of claim 15 wherein when a fault condition is generated at a negative terminal of said HVDC bus said op-amp signals said first switch to enable said alternate path.

* * * * *